Patented Apr. 10, 1923.

1,451,004

UNITED STATES PATENT OFFICE.

LOUIS E. BARTON AND CHARLES J. KINZIE, OF NIAGARA FALLS, NEW YORK, ASSIGNORS TO THE TITANIUM ALLOY MANUFACTURING COMPANY, INC., OF NIAGARA FALLS, NEW YORK, A CORPORATION OF MAINE.

METHOD OF SEPARATING ZIRCON FROM UNDESIRED SUBSTANCES.

No Drawing.   Application filed July 16, 1921.   Serial No. 485,404.

*To all whom it may concern:*

Be it known that we, LOUIS E. BARTON and CHARLES J. KINZIE, both citizens of the United States, and residents of the city of Niagara Falls, in the county of Niagara and State of New York, have jointly invented a new and useful Method of Separating Zircon from Undesired Substances, of which the following is a specification.

Our invention relates to the separation, or extraction of zircon, i. e., the silicate of zirconium ($ZrSiO_4$) from its association, as found in nature or otherwise, with other substances which may be undesirable for certain uses, for example iron oxides, and particularly titanium oxide, and the object of our invention is to provide for the purpose a more efficient, economical, and readily worked procedure and treatment than heretofore.

Zircon is rarely, if ever, found of such purity in quantities requisite for industrial uses as to be serviceable, even after concentration, unless the mass be subjected to further, usually chemical, purifying treatments.

These have comprised the use of acids, such as hydrochloric acid, for the purpose whereby a considerable part of the iron oxide was indeed removed but leaving, however, a non-negligible remainder thereof, and also, as is more detrimental for certain uses, failing to sufficiently, if at all, remove such impurities as titanic oxide, usually, if not invariably, found present in ores, (including sands) containing zircon and more or less difficultly separable therefrom.

We have discovered that by treatment of such ores with alkali metal bisulphates, for example nitre cake ($NaHSO_4$) at certain suitable temperatures, practically all of the substances which are undesirable, for certain uses, owing to their coloration, as for instance iron oxide, certain titanium compounds, maganese oxide, etc., can, under proper conditions, be removed leaving a substantially pure white final product composed essentially, or entirely, of zircon.

Our process is practiced as follows: The ore, or sand, etc., containing zircon,—for example,—is, if too coarse, first comminuted as by crushing to a fineness of subdivision indicated by the nature and quantity of the impurities present,—such crushing being usually dispensable as regards for example zircon concentrates which are frequently in the form of a sufficiently fine sand. A fineness of, for example, 80 to 100 to the inch mesh, has usually given us excellent results both as regards separation of the zircon, and also the manipulations incident to subsequent steps of our process.

The to-be-treated mass thus naturally or artificially of required fineness, we commingled and heat with, for example, the nitre cake previously crushed to a size of about not more than one-quarter inch mesh, or with the nitre cake in molten state, but it will be understood that if nitre cake specifically is inconveniently obtainable we can supply to the charge the required metal alkali bisulphate agent by using as a substitute therefor a neutral sulphate such as "salt cake" with an indicated proportion of free sulphuric acid thereby producing the alkali metal sulphate by reaction in the charge.

The proportion of nitre cake to the charge of material treated is variable within wide limits according to the type of furnace employed to melt it. For example we find it preferable to use, when operating with a reverberatory furnace, a charge of 0.5 parts by weight of nitre cake to one part of the zircon-containing ore or sand, as such a charge can, after the melting, be raked from the furnace, and a smaller proportion of the nitre cake would result in a stiffer product, not so readily removed. On the other hand, a larger proportion of nitre cake, for example, one part thereof to one part of the material, will result in fluidity such that the product can be run from the furnace after occurrence of the required reactions.

The duration of the heat, and its temperature should, for the best results, be, in each case, controlled according to the nature of the impurities. For example, if iron compounds or titanium in the form of ilmenite be undesired in the final product, we find it preferable to heat more briefly and at lower temperature than when titanic oxide, —for instance rutile, is present.

For example, with a charge proportion of 0.5 parts of nitre cake to one part of ore, the impurities being iron oxide, ilmenite and rutile, we have found that heating for one to two hours, at 600° C. to 650° C. gives excellent results. It is preferable, if not always essential, to so proportion the charge, and regulate the time and temperature of the heat, as to ensure the presence of an excess of acid sulphate during the heating. If the acid sulphate be not thus in excess, or has been completely decomposed to normal sulphate by too protracted or high heat, not only will the melt prove undesirably difficult to remove from the furnace but, as is even more undesirable, the purification is likely to be less complete than required.

We have discovered that during the heat the impurities such as those of iron or titanium are converted into water soluble sulphates while the zircon will remain unaffected.

The resulting product is, after the heat, withdrawn from the furnace, cooled, crushed, and lixiviated, thereby disintegrating it, in water which dissolves the impurities. The disintegration may be conveniently conducted by charging the product of the heat with water into a barrel and revolving it slowly. The disintegrated charge is allowed to settle, its liquids are withdrawn as by decantation, the residuum thoroughly washed, and finally dried, and the resulting final purified product will be found to consist essentially, if not entirely of zircon, especially adapted for uses in which coloring oxides are objectionable as, for example, in porcelain, glass and white vitrified enamels. Not only this but our so purified zircon product is also superior for refractory purposes, since, by our process, it is freed from titanium compounds which tend to relatively lower the melting point of the refractory into which the zircon is incorporated.

As an illustration of the effect of our process applied to a specimen of ore of the types above referred to note the following respective analyses of said specimen and of our therefrom derived purified, or refined, zircon product, this particular ore having contained comparatively little iron, but a very considerable proportion of the more difficultly removable rutile.

| | Ore. | Refined zircon. |
|---|---|---|
| Silica | 31.10 | 36.86 |
| Zirconia | 56.60 | 61.50 |
| Alumina | 1.84 | .74 |
| Iron oxide | .35 | .17 |
| Titanic oxide | 8.92 | .50 |

Having now described our invention, we claim the following, viz:

1. The method of treating ores containing zircon and therewith entangled undesired substances which comprises commingling therewith an alkali metal bisulphate, heating the charge, lixiviating the resulting product, and separating its liquids from its zircon residuum.

2. The method of treating ores containing zircon and therewith entangled undesired substances, which comprises commingling therewith nitre cake, heating the charge, lixiviating the resulting product and separating its liquids from its zircon residuum.

3. The method of treating ores containing zircon and therewith entangled undesired substances, which comprises comminuting them, commingling therewith an alkali metal bisulphate, heating the charge, lixiviating the resulting product and separating its liquids from its zircon residuum.

4. The method of treating ores containing zircon and therewith entangled undesired substances, which comprises commingling therewith an alkali metal bisulphate, heating the charge at a temperature such, and so controlled as to ensure the presence of an acid sulphate during the heating, lixiviating the resulting product and separating its liquids from its zircon residuum.

5. The method of treating ores containing zircon and a therewith entangled compound of titanium, which comprises commingling therewith an alkali metal bisulphate, heating the charge, lixiviating the resulting product, and separating its liquids from its zircon residuum.

6. The method of treating ores containing zircon and therewith entangled undesired substances which comprises commingling therewith an alkali metal bisulphate, and heating the charge.

LOUIS E. BARTON.
CHARLES J. KINZIE.